United States Patent
Jagadeesan et al.

(10) Patent No.: US 7,072,291 B1
(45) Date of Patent: Jul. 4, 2006

(54) DEVICES, SOFTWARES AND METHODS FOR REDUNDANTLY ENCODING A DATA STREAM FOR NETWORK TRANSMISSION WITH ADJUSTABLE REDUNDANT-CODING DELAY

(75) Inventors: Ramanathan Jagadeesan, San Jose, CA (US); Bich Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1008 days.

(21) Appl. No.: 09/938,741

(22) Filed: Aug. 23, 2001

(51) Int. Cl.
*G01R 31/08* (2006.01)
(52) U.S. Cl. .................... 370/216; 704/262
(58) Field of Classification Search ............ None
See application file for complete search history.

(56) References Cited

U.S. PATENT DOCUMENTS

| | | | |
|---|---|---|---|
| 5,870,412 A * | 2/1999 | Schuster et al. | 714/752 |
| 6,512,761 B1 * | 1/2003 | Schuster et al. | 370/352 |
| 6,700,893 B1 * | 3/2004 | Radha et al. | 370/252 |
| 6,757,654 B1 * | 6/2004 | Westerlund et al. | 704/262 |
| 2002/0069388 A1 * | 6/2002 | Niu et al. | 370/216 |

* cited by examiner

*Primary Examiner*—Duc Ho
*Assistant Examiner*—Phuongchau Ba Nguyen
(74) *Attorney, Agent, or Firm*—Marger Johnson & McCollo

(57) ABSTRACT

Devices, softwares and methods are provided for redundantly encoding a data stream into frames for network transmission as packets. A main encoder encodes a data stream into main frames, while a redundant encoder encodes it into redundant frames. The redundant frames have a redundant-coding delay from the main frames that is adjustable to accommodate many different sets of network conditions.

40 Claims, 6 Drawing Sheets

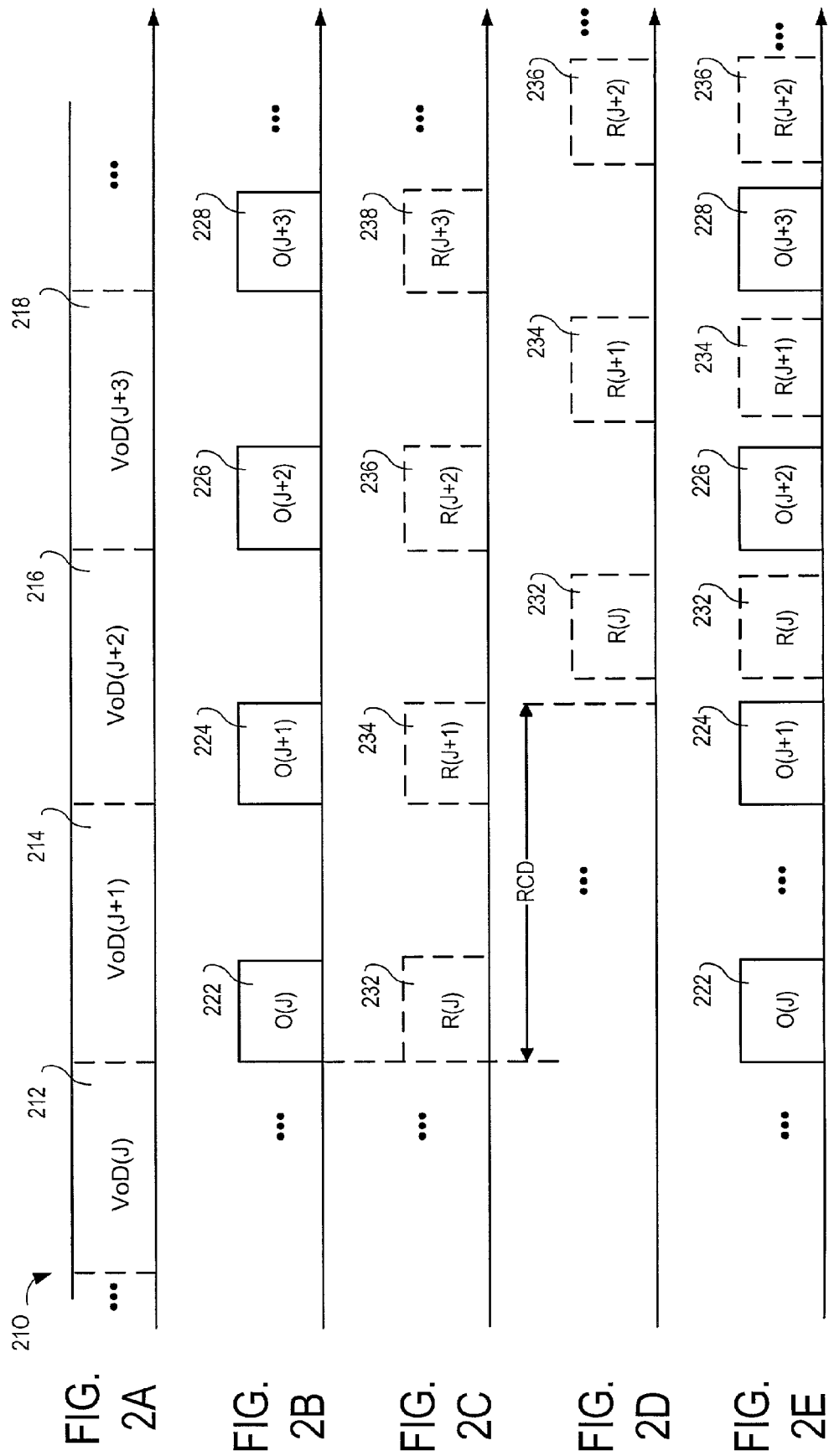

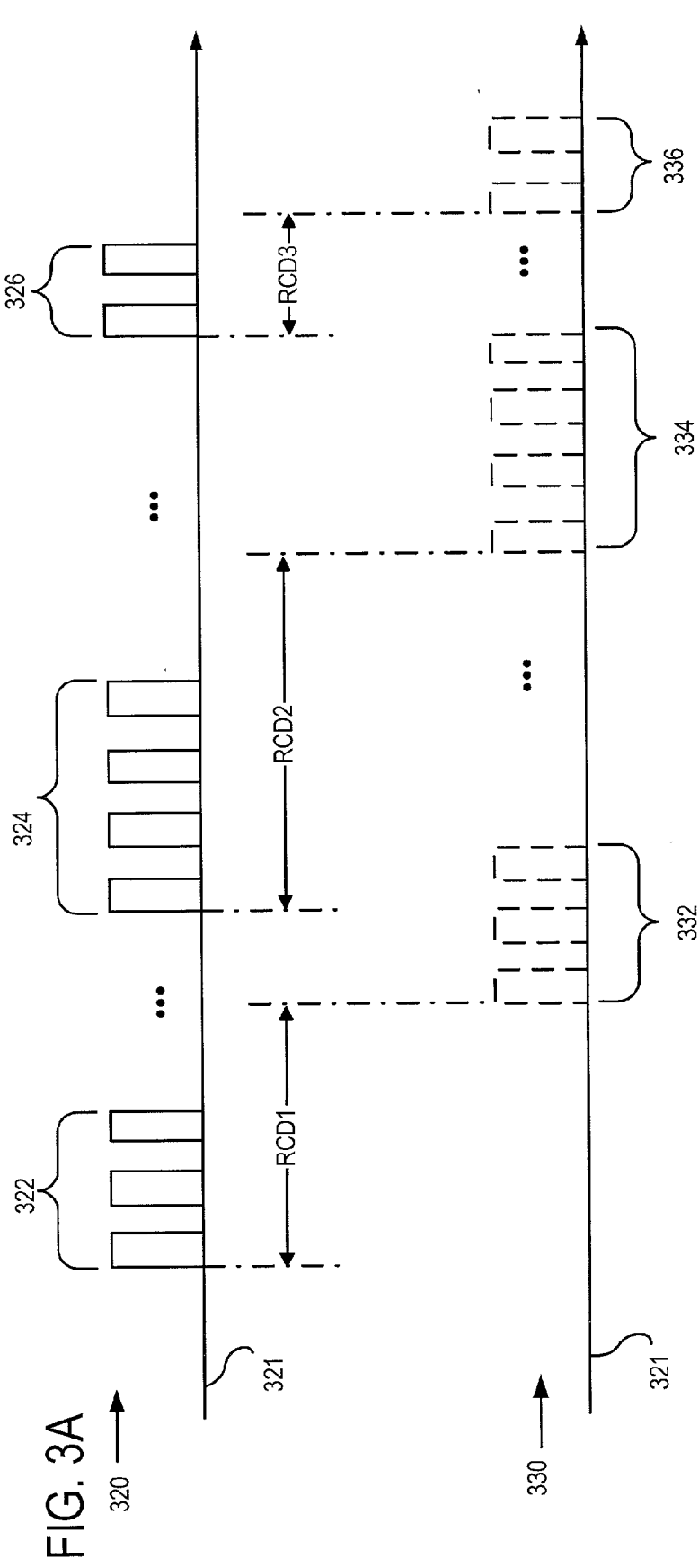

600

| 610 | INPUT INITIAL REDUNDANT CODING DELAY (DELAY OF REDUNDANT PACKETS FROM ORIGINAL PACKETS = "RCD") |

| 620 | START RECEIVING (VOICE) DATA STREAM |

| 630 | ENCODE NEXT PORTION OF DATA STREAM IN ORIGINAL FRAME(S) |

| 640 | ENCODE REDUNDANTLY NEXT PORTION IN REDUNDANT FRAME(S) USING LAST DETERMINED RCD |

| 650 | TRANSMIT ORIGINAL AND REDUNDANT FRAME(S) THROUGH NETWORK |

| 660 | DETERMINE UPDATED REDUNDANT-CODING DELAY ("RCD") |

| 670 | IF UPDATED "RCD" IS BELOW MINIMUM THRESHOLD, SET "RCD" = MINIMUM THRESHOLD |

| 680 | IF UPDATED "RCD" IS ABOVE MAXIMUM THRESHOLD, SET "RCD" = MAXIMUM THRESHOLD |

FIG. 6

DEVICES, SOFTWARES AND METHODS FOR REDUNDANTLY ENCODING A DATA STREAM FOR NETWORK TRANSMISSION WITH ADJUSTABLE REDUNDANT-CODING DELAY

BACKGROUND OF THE INVENTION

1. Field of the Invention

The present invention is related to the field of telephony using a packet network protocol, and more specifically to devices, softwares and methods for encoding voice data to conceal packet loss.

2. Description of the Related Art

Networks such as the internet are used for telephony, in addition to sending data. Accordingly, voice is encoded into digital data, the data is arranged in packets, and the packets are transmitted to the recipient over a network. Telephony requires that this process happen in real time.

A disadvantage of protocols that permit real time use is that they are unreliable, in that they permit packets to be lost, without retrieving them. When that happens, the voice segments they were carrying are not reconstructed, and the recipient hears annoying gaps in speech. These gaps are perceived as reduced quality of service.

In order to conceal the fact that a packet has been lost, redundancy schemes have been devised. Redundant packets are encoded and transmitted, which repeat aspects of the original data. If a packet is lost, its data is recovered and/or reconstructed from its corresponding redundant packet, which is hopefully not lost. A jitter buffer at the receiving end collects the primary and redundant packets, and then plays them out.

Packets tend to become lost in groups, which are called bursts. Redundant data is sent with a redundant-coding delay from the original data. The delay is chosen to be long enough to avoid large bursts of packet loss and small enough to where the resulting delay at the receiving end is tolerable.

A problem, however, is that the burst length of packet loss episodes fluctuates with time. If the burst length exceeds the chosen delay, the redundant packets will also be lost, and the redundancy scheme will not work. On the other hand, while the burst length is much smaller than the delay, the delay turns out to be unnecessarily long for playout. Accordingly, the manufacturer has to make determinations as to what delay to program into the system. And every such determination will optimize a system for one set of conditions, while rendering it sub-optimum for others.

BRIEF SUMMARY OF THE INVENTION

The present invention overcomes these problems and limitations of the prior art.

Generally, the present invention provides devices, softwares and methods for redundantly encoding and transmitting voice data through a network. The voice data is encoded in main and redundant frames, which are transmitted through the network in packets. The invention adjusts a redundant-coding delay between the original frames and the redundant frames in real time, to optimize performance for a single transmission.

The invention offers the advantage that the voice quality of VoIP is improved even in the face of large network losses, while the end-to-end delay is reduced when the network losses become small. In other words, the invention provides a system whose redundant-coding delay is optimized while performing under many different sets of conditions.

In the preferred embodiment, the invention optionally further monitors a performance of the network. It then signals to adjust accordingly the redundant-coding delay.

The invention offers the additional advantage that a manufacturer need not predict an optimum value for the redundant-coding delay, for programming into the device. The manufacturer may set an initial value, confident that the automatic adjustment provided by the invention will optimize it for the encountered set of conditions, even if they are changing.

The invention will become more readily apparent from the following Detailed Description, which proceeds with reference to the drawings, in which:

BRIEF DESCRIPTION OF THE DRAWINGS

FIG. 2A is a diagram of a segment of a data stream as it passes a point A along a time axis in the device of FIG. 1.

FIGS. 2B, 2C, 2D, 2E are diagrams of packets respectively at points B, C, D, and E in the device of FIG. 1 that are generated from the data of FIG. 2A, along the same time axis as FIG. 2A, according to an embodiment of the invention.

FIG. 3A is a diagram of encoded original data packets according to an embodiment of the invention.

FIG. 3B is a diagram of redundant data packets corresponding to those of FIG. 3, but having adjusted redundant encoding delays according to the invention.

FIG. 6 is a flowchart illustrating a method according to an embodiment of the present invention.

DETAILED DESCRIPTION OF THE PREFERRED EMBODIMENT(S)

As has been mentioned, the present invention provides devices, softwares and methods for redundantly encoding and transmitting voice data through a network, with an adjustable redundant-coding delay between the original data and the redundantly transmitted data. The invention is now described in more detail.

Figure 1:
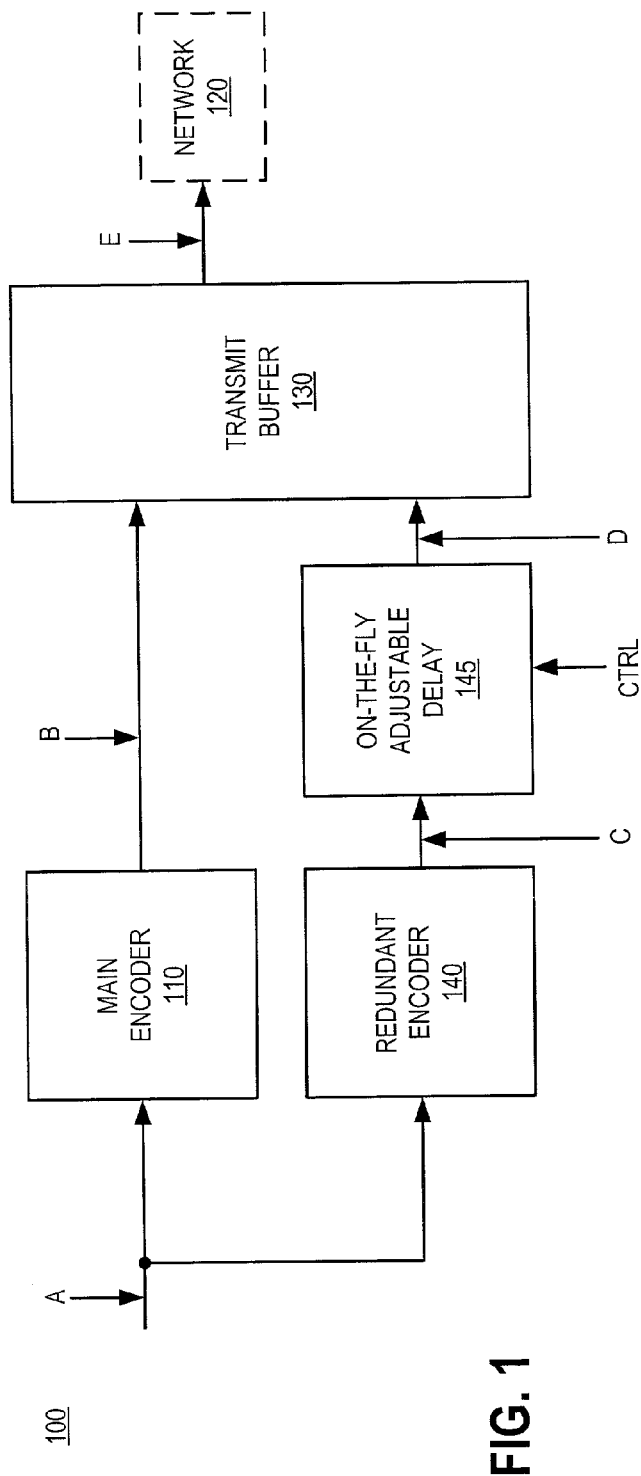
FIG. 1 is a block diagram of a transmitting device made according to an embodiment of the invention.

Referring to FIG. 1, a transmitting device 100 made according to an embodiment of the invention is described. Device 100 may be a network telephone, which is also known as an Internet Protocol (IP) phone. But device 100 may also be a network VoIP (Voice over IP) device, such as a network switch, e.g. a router, a gateway, a bridge, etc.

Device 100 includes a main encoder 110 for encoding voice data into original packets for transmission through a network 30, such as the internet. In addition, device 100 optionally includes a transmit buffer 130 adapted to receive inputs from the main encoder 110, for transmitting the encoded frame.

Device 100 also includes a redundant encoder 140 for encoding into redundant packets the same voice data as main encoder 110. The redundant packets are input in transmit buffer 130, if one is provided.

Device 100 also includes an adjustable delay for delaying the redundant packets with respect to the original packets, responsive to a control signal CTRL. The adjustable delay may be implicitly provided within any one of the components of device 100. The amount of the delay is called redundant coding delay (RCD), and may be expressed in units of time.

In some embodiments, the adjustable delay is provided explicitly as a separate component, namely an on-the-fly adjustable delay 145. Adjustable delay 145 may be provided equivalently before or after redundant encoder 140.

The operations of device 100 are now described in more detail. The operations are described in terms of how voice data is received at point A, and how it is rendered at point B for network 30.

FIG. 2A shows a segment 210 of a stream of voice data, as it passes through point A. Segment 210 is shown subdivided in successive frames 23, 214, 216, 218 of voice data VoD(J), VoD(J+1) VoD(J+2), VoD(J+3) respectively. J is an index of the frames, as they occur in the sequence of the voice data stream. Each one of frames 23, 214, 216, 218 may be 20 msec in duration, or another suitably designed value.

FIG. 2B shows original encoded frames O(J) 222, O(J+1) 224, O(J+2) 226, O(J+3) 228, generated by main encoder 110. These correspond to successive frames 23, 214, 216, 218 of voice data VoD(J), VoD(J+1) VoD(J+2), VoD(J+3) respectively. It will be observed that each one of original encoded frames O(J) 222, O(J+1) 224, O(J+2) 226, O(J+3) 228 occupies less time than its corresponding frame, which is a result of compression.

In fact, the original encoded frames O(J) 222, O(J+1) 224, O(J+2) 226, O(J+3) 228 may already be packetized, depending on the embodiment used. But in FIG. 2B (as well as in FIG. 2C, FIG. 2D, FIG. 2E), only the time relationships are examined.

The encoded frames in FIG. 2B (and also in FIG. 2C, FIG. 2D, FIG. 2E) should be shown slightly offset from the corresponding frames of FIG. 2A. The offset would be due to a processing delay. The offset is not shown so as to better illustrate the correspondences.

FIG. 2C shows redundant encoded frames R(J) 232, R(J+1) 234, R(J+2) 236, R(J+3) 238, generated by redundant encoder 140. These may encode the same information as their corresponding original encoded frames O(J) 222, O(J+1) 224, O(J+2) 226, O(J+3) 228, or only an aspect of it. Redundant encoded frames R(J) 232, R(J+1) 234, R(J+2) 236, R(J+3) 238 are intended to be received and used to reconstruct the original data stream, where original encoded frames have been lost.

In the embodiment of FIG. 1, redundant encoded frames R(J) 232, R(J+1) 234, R(J+2) 236, R(J+3) 238 are generated at the same time as their corresponding original encoded frames O(J) 222, O(J+1) 224, O(J+2) 226, O(J+3) 228. That is because redundant encoder 140 receives the same inputs as main encoder 110, and at the same time, while the delay 145 is provided as an explicitly separate unit.

FIG. 2D shows redundant encoded frames R(J) 232, R(J+1) 234, R(J+2) 236, as delayed by delay 145. They are the same data as in FIG. 2C, only delayed relative to their corresponding original encoded frames O(J) 222, O(J+1) 224, O(J+2) 226.

Importantly, FIG. 2D illustrates the amount of redundant coding delay ("RCD"). It is the time difference, measured along the data stream segment 210 of FIG. 2A, between the original encoded frame and its corresponding redundant encoded frame. RCD is thus properly measured in terms of time. RCD can be adjusted according to the invention, as is described later in this document.

FIG. 2E shows the encoded frames output by buffer 130 into network 30. These include the original encoded frames O(J) 222, O(J+1) 224, O(J+2) 226, O(J+3) 228 of FIG. 2B, along with the delayed redundant encoded frames R(J) 232, R(J+1) 234, R(J+2) 236 of FIG. 2D. In other words, FIG. 2E is created by adding FIG. 2B with FIG. 2D.

In FIG. 2E, the original encoded frames O(J) 222, O(J+1) 224, O(J+2) 226, O(J+3) 228 (as depicted in FIG. 2B) and the delayed redundant encoded frames R(J) 232, R(J+1) 234, R(J+2) 236 are packetized and transmitted.

The present discussion is mainly in terms of frames, as opposed to packets. While frames are transmitted through the network in packets, it is the frames that carry the voice data. According to the present invention, an original encoded frame (such as O(J+2) 226) may or may not be combined in the same packet with an adjacent redundant encoded frame (such as R(J+1) 234). Such combination is advantageous, however, so as to reduce packet header overhead.

The drawing of FIG. 2E makes it easy to measure RCD also in terms of how many frames a redundant frame occurs after its corresponding original frame. For example, in FIG. 2E, that is between 1 and 2 frames. This may be converted to time, by multiplying with the chosen duration of the frames of FIG. 2A. Assuming 20 msec frames, the RCD in FIG. 2E is then 20–40 msec.

Referring now to FIG. 3A, a stream 320 of original data packets is depicted along a time axis 321. Only selected groups 322, 324, 326 of these original packets are shown with their individual packets. FIG. 3A corresponds to FIG. 2B.

Referring now to FIG. 3B, a stream 330 of redundant data packets is depicted along the same time axis 321. Only selected groups 332, 334, 336 of these redundant packets are shown, those that correspond to groups 322, 324, 326. FIG. 3B corresponds to FIG. 2D.

Referring now to both FIG. 3A and FIG. 3B, pairings of groups are examined. It will be observed that the pair of original group 322 with its corresponding redundant group 332 has a redundant coding delay of RCD1. Moreover, the subsequent pairs have a different redundant coding delay of RCD2, and then later a yet different delay of RCD3. These different values are accomplished within the same stream according to the invention. Changing the value of the redundant coding delay is accomplished on the fly, responsive to control signal CTRL.

The invention need not necessarily be concerned with possible overlapping of the packets of FIG. 3A and FIG. 3B, once they are combined. Transmit buffer 130 may adjust for that by slight shifting, but the redundant coding delays RCD1, RCD2 RCD3 are built in, and secured by time stamps.

Figure 4:
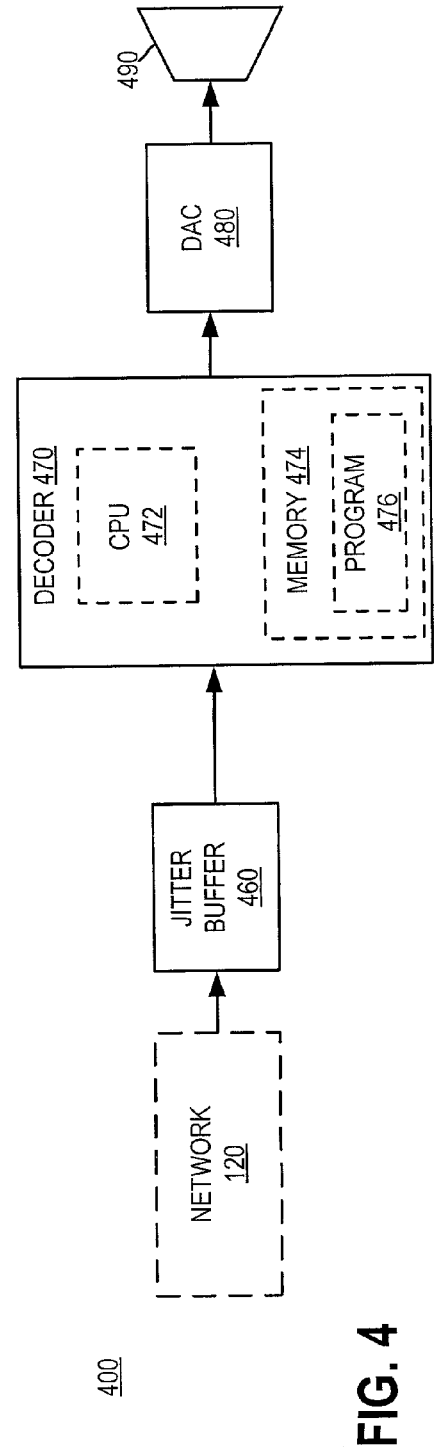
FIG. 4 is a block diagram of a receiving device made according to another embodiment of the invention.

Referring to FIG. 4, a receiving device 400 according to the invention is described. Device 400 may be an (IP) phone. But device 400 may also be a network retransmitting device, such as a network switch, e.g. a router, a gateway, a bridge, etc.

Device 400 includes a network interface (not shown separately) for interfacing with network 30. The network interface can be implemented as a stand-alone feature, or in conjunction with another component, such as a jitter buffer.

Optionally and preferably device 400 includes a jitter buffer 460. Jitter buffer 460 stores a number of packets immediately as they are received from the network 30. This includes both original and redundant packets. Once an original packet is received, its corresponding redundant packet may be discarded from jitter buffer 460. If an original packet is lost or not received in time for playout, its corresponding redundant packet is sought so that the payload of the lost original packet may be reconstructed.

Jitter buffer 460 thus prevents the jitter that would be experienced, if frames were played out at the exact moment they are received, and in the exact order they are received. That order could be scattered, due to the nature of transmission through the network 30. Plus the packets could arrive bunched, thus leaving gaps.

Device 400 also includes a decoder 470. One or more of the components of device 400 can be implemented in combination with each other, consistently with components of this description. In the embodiment of FIG. 4, decoder 470 includes a processor 472, which may be a Digital Signal Processor (DSP). Processor 472 may also be made from a Central Processing Unit (CPU) 472, and a memory 474. The processor 472 is adapted to perform the method of the invention. Preferably it is so adapted by running a program 476 made according to the invention, which resides on memory 474.

Device 400 can also include other components, such as a Digital to Analog Converter (DAC) 480. This converts the decoded voice data into an analog signal, which can be input in a speaker 490.

Figure 5:
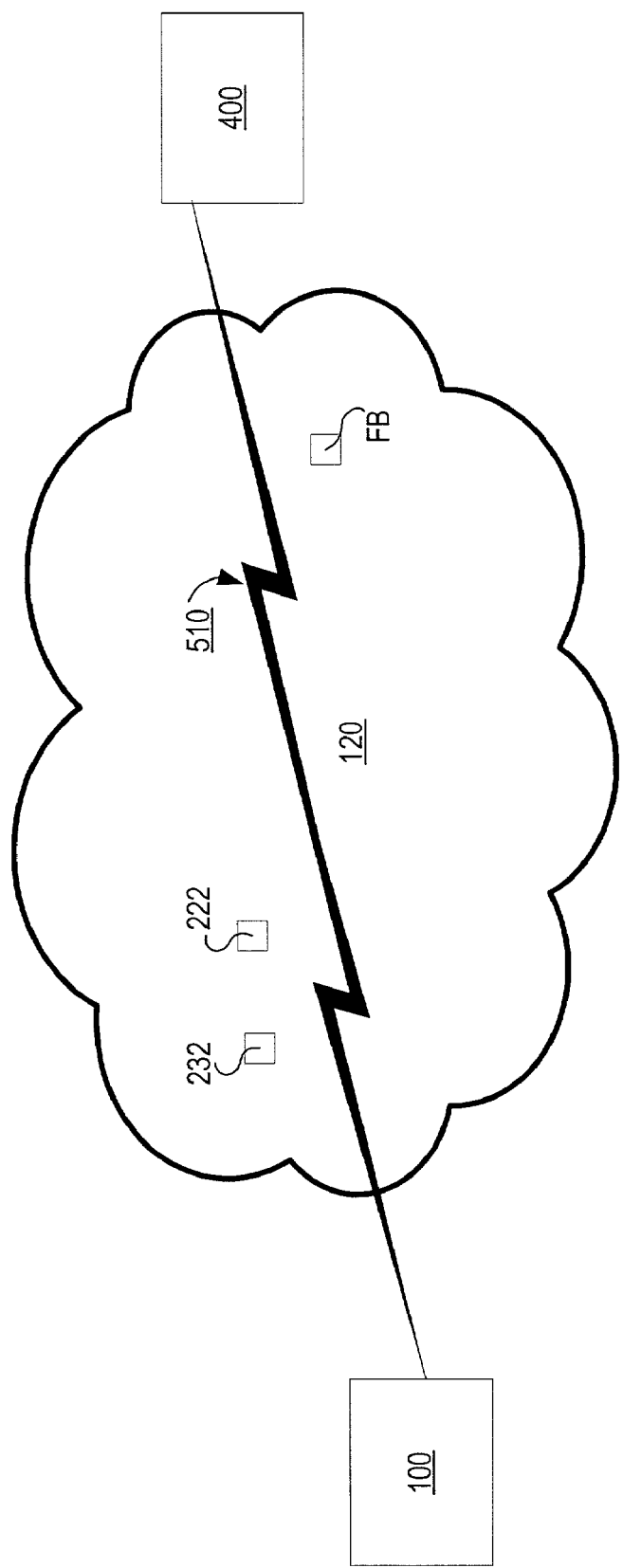
FIG. 5 is a diagram of network transmissions between the device of FIG. 1 and FIG. 4.

Referring now to FIG. 5, a configuration according to the invention is described. The device 100 of FIG. 1 has established a connection 510 with the device 400 of FIG. 4. Connection 510 may be made using a VoIP protocol over a network 30, such as the internet. Connection 510 is also known as channel.

Device 100 transmits a packet containing an original encoded frame 222 along connection 510, and then a packet containing a redundant encoded frame 232. These are received by device 400.

Redundant encoded frame 232 has been encoded a redundant coding delay ("RCD") time after its corresponding original encoded frame 222. The RCD does not speak, however, to when frame 232 will be received in relation to frame 222.

In some embodiments of the invention, device 400 gauges the performance of network 30, and may send back a feedback packet FB. Feedback packet FB may be implemented in conjunction with signaling schemes. One such scheme may be RTP-NSE (Real-Time Transport Protocol Named Signaling Events). Another such scheme may be RTCP (RTP Control Protocol) report extensions, etc.

Later in this document it will be seen that the feedback packet FB may be used for determining the control signal CTRL of FIG. 1, if the control signal CTRL is not determined exclusively by device 100. In those cases, it will be seen how the payload of feedback packet FB is determined to adjust the RCD on the fly, according to the invention.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods that are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases, there should be borne in mind the distinction between the method the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Referring now to FIG. 6, a flowchart 600 is used to illustrate a method according to an embodiment of the invention. The method of flowchart 600 may also be practiced by device 100.

According to a box 610, a value is input for an initial redundant coding delay ("RCD"). This value is also known as a present value.

According to a next box 620, a data stream starts being received. The data stream may be a voice data stream.

According to a next box 630, a next portion of the data stream is encoded in one or more original frames.

According to a next box 640, the same portion of the data stream is encoded redundantly in redundant frames. Redundant encoding is performed using the last determined RCD. If this is the first time this happens, then the last determined RCD is the present value input in box 610.

According to a next box 650, the original frames and the redundant frames are transmitted through a network. They are transmitted as packets.

According to an optional next box 660, an updated value is determined for the RCD. The updated value may well be different from the immediately previous value, such as the initial value. The updated value may be determined from feedback signal received through the network. Or it may be determined internally from a device executing the method of the invention.

Determination of the updated value may be by first determining at least one performance parameter of the network, after encoding and the transmission has started. The updated value may be expressed as an instruction to increment or decrement the present value.

Alternately, an ideal value of a redundant encoding delay may be determined from the performance parameter. In one embodiment, a return stream of VoIP packets is received, and its inherent return RCD is determined. That can serve as the performance parameter, especially if the network channel is assumed to be symmetric (i.e. exhibit the same behavior in each direction).

Once having determined the performance parameter, the ideal value may be determined by using a look up table or a polynomial curve fit, etc. The ideal value may be expressed as an offset from the present value. The offset may be computed as a percentage difference, e.g. a fraction of the difference in values over one of the two values.

In yet one more group of embodiments, the performance parameter is determined in terms of the burstiness of the network. In other words, losses of packets are considered to be according to a bursty model. Accordingly, episodes are considered of where consecutive packets are received or lost.

In a first embodiment, an episode length number is determined, e.g. by counting. Those may be for the overall stream, or only within a moving time window. A time difference between consecutive episodes may be determined. Also, an average and/or variance of such episode length numbers are computed. The RCD should be larger than the average.

In a second embodiment, a two-state Markov chain model is used. In other words, a good state is postulated for no packets lost, and a bad state is postulated for packets lost. When, after at least one packet is received, one is lost, that means a transition from the good state to the bad state. A p number is determined (e.g. by counting) for such transitions. In addition, a q number may be determined for counting the complementary transitions (i.e. from the bad state to the good state).

In addition, these numbers p and q may be used to derive transition probabilities P, Q, for measuring the burstiness of the packet loss. For example, Q may be computed as q/(# of lost packets). When the transition probability Q is low, likelihood of a long burst of packet loss is high, and a longer RCD is required to overcome it. The average loss rate r may be computed from (# of lost packets)/(# of total packets), and may also be computed from p and q. Again, these statistics may be tracked for the entire data stream, or for a moving time window.

According to an optional next box 670, if the updated value of the RCD is below a preset minimum threshold, then it is set equal to that minimum threshold.

According to an optional next box 680, if the updated value of the RCD is above a preset maximum threshold, then it is set equal to that maximum threshold.

Execution then may return to box 630, for the next portion, until the data stream is concluded.

Figure 7:
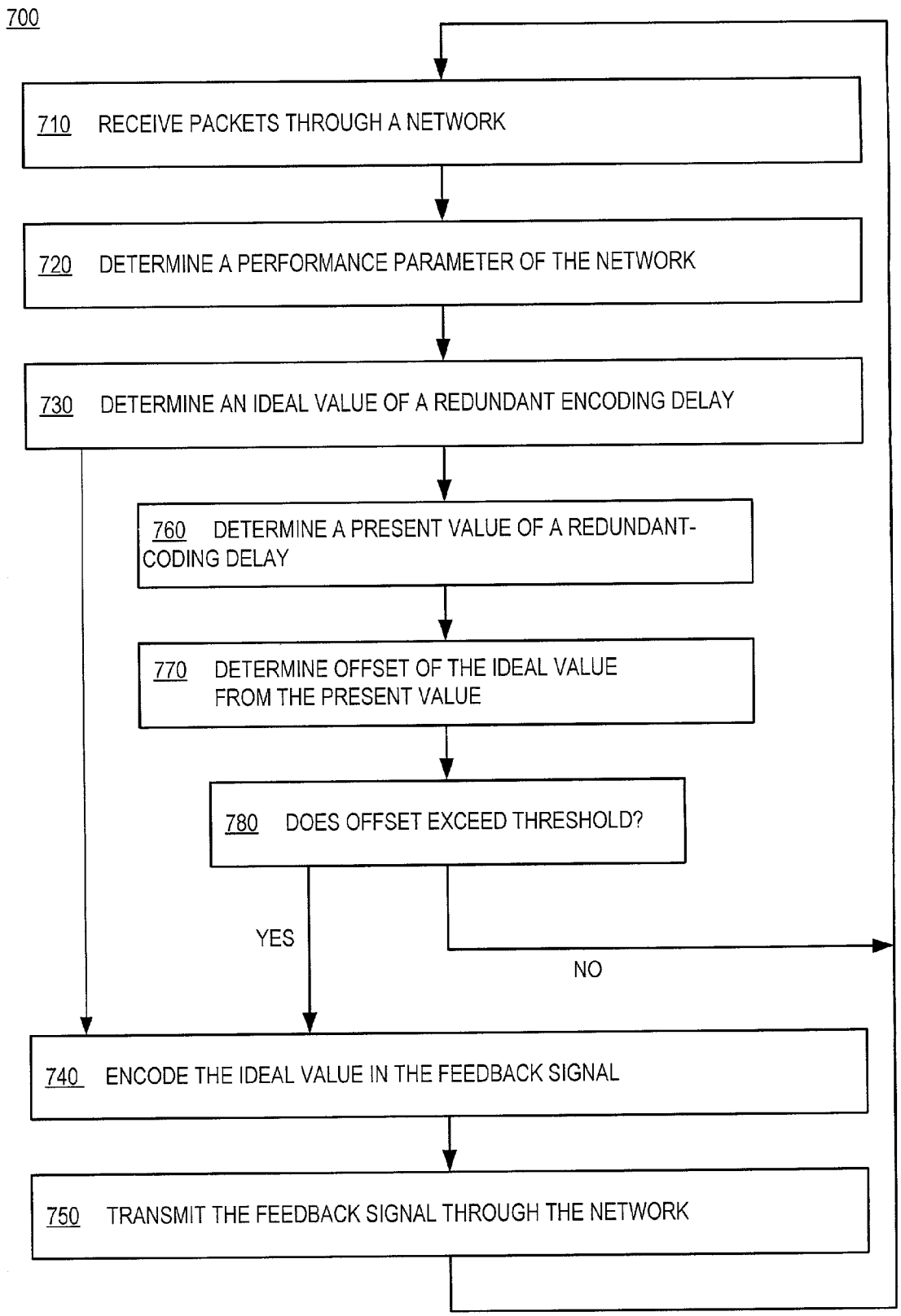
FIG. 7 is a flowchart illustrating a method according to another embodiment of the present invention.

Referring now to FIG. 7, a flowchart 700 is used to illustrate a method according to another embodiment of the invention. The method of flowchart 700 may also be practiced by device 400 of FIG. 5. In other words, device 400 may cooperate with the transmitting device 100.

According to a box 710, packets are received through a network.

According to an optional next box 720, a performance parameter of the network is determined. This may be performed in ways similar to what was described in connection with FIG. 6 above, e.g. by determining how many packets are lost, etc. Moreover, device 400 is additionally capable of determining the network performance parameter from the reception of the packets. The performance parameter itself may be a return redundant coding delay of frames contained in the received packets.

According to a next box 730, an ideal value of a RCD is determined. This can be accomplished as per the above. The ideal value may be found explicitly from a table look up, a polynomial curve fit, etc.

In one embodiment, according to a next box 740, the ideal value is encoded in a feedback signal, such as signal FB of FIG. 5. Then according to a next box 750, the feedback signal is transmitted through the network. Execution then returns to box 710.

In another embodiment, according to an optional next box 760, a present value of RCD is determined after box 730. Then according to a next box 770, the ideal value is compared with the present value, to determine an offset. Then according to an optional next box 780, it is inquired if the offset exceeds a preset threshold. If yes, execution continues to box 740. If not, it returns to box 710.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a main encoder for encoding a first portion of a data stream into first frames and a second portion of the data stream into second frames, the second portion following the first portion; and
   a redundant encoder for encoding the first portion into first redundant frames that are delayed from the first frames according to a redundant-coding delay having a first value and the second portion into second redundant frames that are delayed from the second frames according to a redundant-coding delay having a second value determined from a detected network performance characteristic different from the first value.

2. The device of claim 1, further comprising an adjustable delay for imparting the redundant-coding delay into the first and second redundant frames, the adjustable delay for controlling a value of the redundant-coding delay responsive to a control signal associated with the network performance characteristic.

3. A device comprising:
   means for inputting a present value for a redundant-coding delay;
   means for encoding a first portion of a data stream into first frames;
   means for redundantly encoding the first portion into first redundant frames that are delayed from the first packets according to the present value;
   means for determining a network performance parameter after encoding the first portion;
   means for determining an updated value for the redundant-coding delay that corresponds with the network performance parameter;
   means for encoding a second portion of the data stream into second frames, the second portion following the first portion; and
   means for redundantly encoding the second portion into second redundant frames that are delayed from the second frames according to the updated value.

4. The device of claim 3, further comprising a means for setting a minimum threshold for the redundant-coding delay, wherein the updated value for the redundant-coding delay is maintained not below the minimum.

5. The device of claim 3, further comprising a means for setting a maximum threshold for the redundant-coding delay, wherein the updated value for the redundant-coding delay is maintained not above the maximum.

6. The device of claim 3, further comprising a means for receiving a feedback signal through a network, wherein the updated value is determined also from the feedback signal.

7. The device of claim 3, further comprising:
   means for receiving a return stream of packets through a network; and
   means for determining a return redundant coding delay of the return stream,
   wherein the updated value is determined also from the return redundant coding delay.

8. The device of claim 3, further comprising a means for determining an adapted value of a redundant encoding delay from the performance parameter.

9. The device of claim 3, wherein the means for determining the performance parameter includes a means for determining an episode length number of one of an episode of consecutively lost packets and an episode of consecutively received packets.

10. The device of claim 9, wherein the means for determining the performance parameter further includes a means for determining at least one of an average and a variance of the counted episode length number.

11. The device of claim 9, wherein the episode length number is determined for an episode within a moving time window.

12. The device of claim 9, further comprising a means for determining a time difference between consecutive episodes.

13. A method comprising:
   inputting a present value for a redundant-coding delay;
   encoding a first portion of a data stream into first frames;
   redundantly encoding the first portion into first redundant frames that are delayed from the first frames according to the present value;
   determining an updated value for the redundant-coding delay that varies according to a performance parameter;
   encoding a second portion of the data stream into second frames, the second portion following the first portion; and
   redundantly encoding the second portion into second redundant frames that are delayed from the second frames according to the updated value.

14. The method of claim 13, further comprising setting a minimum threshold for the redundant-coding delay, wherein the updated value for the redundant-coding delay is maintained not below the minimum.

15. The method of claim 13, further comprising setting a maximum threshold for the redundant-coding delay, wherein the updated value for the redundant-coding delay is maintained not above the maximum.

16. The method of claim 13, further comprising receiving a feedback signal through a network, wherein the updated value is determined also from the feedback signal.

17. The method of claim 13, further comprising:
   receiving a return stream of packets through a network; and
   determining a return redundant coding delay of the return stream,
   wherein the updated value is determined also from the return redundant coding delay.

18. The method of claim 13, further comprising determining at least one performance parameter of the network after encoding the first portion.

19. The method of claim 13, further comprising determining an adapted value of a redundant encoding delay from the performance parameter.

20. The method of claim 13, wherein determining the performance parameter includes determining an episode length number of one of an episode of consecutively lost packets and an episode of consecutively received packets.

21. The method of claim 20, wherein determining the performance parameter further includes determining at least one of an average and a variance of the counted episode length number.

22. The method of claim 20, wherein the episode length number is determined for an episode within a moving time window.

23. The method of claim 20, further comprising determining a time difference between consecutive episodes.

24. A device for encoding voice data in a network comprising:
encoder circuitry that encodes a data stream into primary data frames and associated redundant data frames;
a delay circuit that separately determines individual delay periods for the redundant data frames according to an identified network performance associated with transmission of the primary data frames over the network, wherein the individual delay periods are determined based on a duration of time in which packets are delayed or lost during transmission of the primary data frames.

25. The device of claim 24 wherein the primary data frames are transmitted at an evenly spaced constant rate during a communication session and the redundant data frames are transmitted at an irregularly spaced rate according to the individual delay periods determined from transmission of the primary data frames.

26. The device of claim 24 wherein the individual delay periods are determined based on a number of dropped packets during transmission of the primary data frames.

27. A method comprising:
receiving a first portion of a data stream as primary data packets and associated redundant data packets having a transmission delay period;
identifying a data transmission performance characteristic associated with receipt of the first portion of the data stream; and
receiving a second portion of the data stream as primary data packets and associated redundant data packets having an updated transmission delay period according to the data transmission performance characteristic, whereby the data transmission performance characteristic is based on an episode length number of one of an episode of consecutively lost packets and an episode length number of consecutively received packets.

28. The method of claim 27 including sending a return stream of packets through a network whereby the updated transmission delay period is determined also from a data transmission performance characteristic associated with the return stream of packets.

29. The method of claim 27 whereby the data transmission performance characteristic is based on a length of time between successfully transmitted primary data packets.

30. A computer-readable medium containing a program for data transmission performance through a packet switched network, the program comprising:

instructions for inputting a present value for a redundant-coding delay;
instructions for encoding a first portion of a data stream into first frames;
instructions for redundantly encoding the first portion into first redundant frames that are delayed from the first frames according to the present value;
instructions for determining an updated value for the redundant-coding delay that varies according to a performance parameter;
instructions for encoding a second portion of the data stream into second frames, the second portion following the first portion; and
instructions for redundantly encoding the second portion into second redundant frames that are delayed from the second frames according to the updated value.

31. The program of claim 30 including instructions for setting a minimum threshold for the redundant-coding delay, wherein the updated value for the redundant-coding delay is maintained not below the minimum.

32. The program of claim 30 including instructions for setting a maximum threshold for the redundant-coding delay, wherein the updated value for the redundant-coding delay is maintained not above the maximum.

33. The program of claim 30 including instructions for receiving a feedback signal through a network, wherein the updated value is determined also from the feedback signal.

34. The program of claim 30, further comprising:
instructions for receiving a return stream of packets through a network; and
instructions for determining a return redundant coding delay of the return stream, wherein the updated value is determined also from the return redundant coding delay.

35. The program of claim 30 including instructions for determining at least one performance parameter of the network after encoding the first portion.

36. The program of claim 30 including instructions for determining an adapted value of a redundant encoding delay from the performance parameter.

37. The program of claim 30, wherein instructions for determining the performance parameter include determining an episode length number of one of an episode of consecutively lost packets and an episode of consecutively received packets.

38. The program of claim 37, wherein instructions for determining the performance parameter further include determining at least one of an average and a variance of the counted episode length number.

39. The program of claim 37, wherein instructions for determining the performance parameter further include determining the episode length number for an episode within a moving time window.

40. The program of claim 30 including instructions for determining a time difference between consecutive episodes.

* * * * *